(12) United States Patent
Guo et al.

(10) Patent No.: US 10,464,812 B2
(45) Date of Patent: Nov. 5, 2019

(54) METHOD FOR CATALYTICALLY REDUCING SELENIUM

(71) Applicant: CENTRAL SOUTH UNIVERSITY, Changsha (CN)

(72) Inventors: Xueyi Guo, Changsha (CN); Runze Xu, Changsha (CN); Dong Li, Changsha (CN); Qinghua Tian, Changsha (CN)

(73) Assignee: Central South University, Changsha, Hunan (CN)

( * ) Notice: Subject to any disclaimer, the term of this patent is extended or adjusted under 35 U.S.C. 154(b) by 0 days.

(21) Appl. No.: 15/743,609

(22) PCT Filed: Mar. 30, 2017

(86) PCT No.: PCT/CN2017/078689
§ 371 (c)(1),
(2) Date: Jan. 10, 2018

(87) PCT Pub. No.: WO2017/173948
PCT Pub. Date: Oct. 12, 2017

(65) Prior Publication Data
US 2019/0016599 A1    Jan. 17, 2019

(30) Foreign Application Priority Data
Apr. 5, 2016 (CN) ............ 2016 1 0206322

(51) Int. Cl.
C01B 19/02        (2006.01)
C01B 15/01        (2006.01)

(52) U.S. Cl.
CPC ............. *C01B 19/02* (2013.01); *C01B 15/01* (2013.01); *C01P 2002/70* (2013.01)

(58) Field of Classification Search
None
See application file for complete search history.

(56) References Cited

U.S. PATENT DOCUMENTS

| 5,425,881 A * | 6/1995 | Szejtli | B09C 1/02 |
| | | | 134/25.1 |
| 6,459,011 B1 * | 10/2002 | Tarr | A62D 3/33 |
| | | | 405/128.5 |
| 2006/0016763 A1 * | 1/2006 | Kerfoot | B09C 1/00 |
| | | | 210/746 |
| 2008/0073072 A1 * | 3/2008 | Drucker | B09C 1/005 |
| | | | 166/67 |
| 2010/0155330 A1 * | 6/2010 | Burba | C02F 1/281 |
| | | | 210/638 |
| 2010/0329970 A1 | 12/2010 | Lian | |

FOREIGN PATENT DOCUMENTS

| CN | 102363522 A | 2/2012 |
| CN | 102583270 A | 7/2012 |
| CN | 104445103 A | 3/2015 |
| CN | 104828788 A | 8/2015 |
| CN | 105668528 A | 6/2016 |
| EP | 2298942 A1 | 3/2011 |
| JP | S54120226 A | 9/1979 |
| WO | 2014207905 | * 12/2014 |

OTHER PUBLICATIONS

Celikkan et al. "The investigation of the electrooxidation of sodium borohydride . . . ". Int Journal of Hydrogen Energy. 588-593, 32 (2007). (Year: 2007).*
International Search Report in international application No. PCT/CN2017/078689, dated Jul. 7, 2017.
The Written Opinion of the International Search Authority in international application No. PCT/CN2017/078689, dated Jul. 7, 2017.
Ou, Gaoyu et al., "Preparation to extract selenium from selenium-containing waste at room temperature", Guangzhou Chemical Industry, vol. 43, No. 18, Sep. 30, 2015 (Sep. 30, 2015), pp. 82 and 83.
English Translation of the Written Opinion of the International Search Authority in international application No. PCT/CN2017/078689, dated Jul. 7, 2017.

* cited by examiner

*Primary Examiner* — Sheng H Davis
(74) *Attorney, Agent, or Firm* — Syncoda LLC; Feng Ma

(57) ABSTRACT

Provided is a method for catalytically reducing selenium. Hydrogen peroxide is used as a catalyst, and a reducer is added to a hexavalent-selenium-containing solution for reaction so as to reduce the selenium to elemental selenium, wherein the standard oxidation-reduction potential of the reducer is lower than the standard oxidation-reduction potential of the conversion of the hexavalent selenium to elemental selenium. The present method can further reduce a hexavalent-selenium element-containing selenic acid or selenate solution to an elemental selenium product in one step. In the present method, the hydrogen peroxide effectively lowers the descending speed of the reduction potential of the solution while having a catalytic effect, so that the reduction reaction process is carried out gently, thereby effectively preventing the selenium in the solution from overreducing to generate negatively bivalent selenium ions or compounds thereof, and solving problems such as a low recovery rate caused by selenium overreduction.

6 Claims, 2 Drawing Sheets

METHOD FOR CATALYTICALLY REDUCING SELENIUM

TECHNICAL FIELD

The disclosure relates to a method for catalytically reducing selenium, and in particular to a method for reducing hexavalent selenium to elemental selenium.

BACKGROUND

As a typical element between metallic elements and non-metallic elements, selenium is widely used in glass and dyeing industries. Selenium plays an irreplaceable role in optimizing performances of glass, preparing a pure red dye of high temperature resistance or the like. In material science, adding selenium into steel, copper and rubber, etc. in various proportions may significantly improve oxidation resistances, mechanical performances and abrasive resistances thereof. The most promising area for selenium may be photoelectric industry. Moreover, due to the unique characteristics of selenium, such as special electrical conductivity and excellent light absorption, selenium plays a vital role in the technical field of semiconductor, laser and electronic components, and these characteristics bring great values in use and demands for selenium.

At present, the recovery of commercial selenium is mainly concentrated in the field of hydrometallurgy. Moreover, selenium is mainly prepared by the processes for conventional selenium evaporation and reduction in copper anode slime, for leaching and reduction of a complex selenium-containing slag material, and for oxidizing leaching and reduction of a selenium-containing secondary material, etc.

However, in the current solution, there are two kinds of knotty problems in the selenium reduction process.

(1) In the selenium reduction process, it is easy to generate negatively bivalent selenium in the solution. Thus, the elemental selenium obtained by the reduction dissolves in the form of ion again, or generates an insoluble compound with heavy metals such as copper, leading to a direct decrease in the recovery rate. Besides, the subsequent treating processes prolong the flow path of the preparation process, and increase the difficulty of selenium recovery process.

(2) In an extraction and separation process of a selenium-containing material, selenium is often separated through oxidizing leaching, roasting or the like, by taking advantage of the characteristic that the selenium and its compounds are easily oxidized and decomposed. However, in the oxidation process, part of the selenium may be over oxidized to hexavalent selenium. The current reduction methods of hexavalent selenic acid or hexavalent selenate are shown as follows.

(i) Elemental selenium is obtained through reducing hexavalent selenium by boiling the latter with high concentrated hydrochloric acid. However, a large amount of acid fog will be generated in a reduction process, and an improper operation may also lead to the leakage of a harmful gas such as chlorine gas. As a result, the possibility of the practical application is low.

(ii) An adsorption-reduction process is carried out using ferrous iron. Ferrous iron may effectively reduce hexavalent selenium to elemental selenium, but the results of the current studies indicate that a reduction with ferrous iron is only suitable for treating a hexavalent selenium solution having an ultra-low concentration. Besides, the reaction rate is slow; and the reduction product is an iron-selenium complex compound, so that it still needs a selenium-iron separation to recover selenium separately, and thus the flow path of the process is complex.

(iii) An adsorption-precipitation process of hexavalent selenium is carried out using an aluminum salt compound. Its problems are similar to those in the ferrite reduction process, that is, its processing capacity is low, it is only suitable for treating the selenium solution having an ultra-low concentration, the reaction rate is slow; and the flow path of the process is complex, and the reduction product is an aluminum-selenium compound.

Hence, in practical industrial production, it is very difficult to effectively recover hexavalent selenium using the existing selenium production procedure, resulting in that hexavalent selenic acid or selenate can only enter a wastewater treatment process and that a lot of resources are wasted. It is because of the defects in the prior art, such as high requirement for reducing hexavalent selenium, long flow path of recovery, etc., that there is still absence of a technique for the recovery of hexavalent selenium with a high recovery rate, a short flow path of the process and a high industrial feasibility.

SUMMARY

To overcome the defects of the prior art, a method for directly reducing hexavalent selenium is provided, and then an elemental selenium product is prepared in one step. The method has the advantages of ease of operation, of high industrial feasibility, and of being an effective solution to the technical problems in the existing selenium production process.

To solve the above technical problems, technical solutions proposed by the disclosure are shown as follows.

Provided is a method for catalytically reducing selenium. Hydrogen peroxide is used as a catalyst, and a reducer is added to a hexavalent-selenium-containing solution for reaction so as to reduce the selenium to elemental selenium. Using hydrogen peroxide as the catalyst may lower the activation energy in the reduction process of hexavalent selenium, and thus effectively reduce hexavalent selenium directly to elemental selenium. Moreover, the presence of hydrogen peroxide may lower the descending speed of the potential in a reduction process, and thus effectively avoid the problem that the selenium is over reduced.

According to an embodiment of the disclosure, the standard oxidation-reduction potential of the reducer is lower than the standard oxidation-reduction potential of the conversion of hexavalent selenium to elemental selenium, that is, the standard oxidation-reduction potential should be lower than the standard oxidation-reduction potential of $Se^{6+}/Se^0$.

According to another embodiment of the disclosure, the reducer is one or more of hydrazine hydrate, sulfur dioxide, sulfite and sodium borohydride.

According to yet another embodiment of the disclosure, the ratio of the volume of the hydrogen peroxide to the selenium concentration in the solution is not lower than 10 mL:1 g/L.

According to a further embodiment of the disclosure, the solution is a hexavalent-selenium-containing selenic acid or selenate solution, and in specific refers to a hexavalent-selenium-containing solution generated in chemical or metallurgical scientific research or industrial production, e.g., a hexavalent-selenium-containing selenic acid or selenate solution generated in a process of the sulfating roasting treatment for anode slime, a hexavalent-selenium-containing selenic acid or selenate solution generated in desulfurization and deselenization processes in coal industry, a hexavalent-selenium-containing selenic acid or selenate solution generated by oxidizing leaching in a process of recovering and treating a selenium-containing waste, a hexavalent-selenium-containing solution prepared from a selenium-containing compound (like selenium dioxide, or seleninic acid, or selenate) in a process for purifying selenium, etc.

According to another further embodiment of the disclosure, the solution may further contain a tetravalent-selenium-containing seleninic acid or a selenite compound.

According to yet another further embodiment of the disclosure, the temperature of the selenium-containing solution in the reduction process is controlled at 0~100° C. In a catalytic reduction process, the pH value and the reaction temperature of the solution do not have great influence on the method for catalytically reducing hexavalent selenium.

A target of the disclosure lies in reducing the activation energy in the reaction process. The selection of hydrogen peroxide as the catalyst for lowering the activation energy in the hexavalent selenium reduction process successfully reduces hexavalent selenium, which is difficult to be reduced kinetically, to elemental selenium. It is found by a thermodynamic research that the standard electrochemical reaction potential of many reducers such as a reducing substance (e.g., sulfur dioxide, sodium borohydride, and the like) is lower than the potential of reducing hexavalent selenium to elemental selenium ($\Psi[Se^{6+}/Se^0]$). However, hexavalent selenium is very difficult to be reduced in a practical research process, since the rapid reduction of hexavalent selenium to elemental selenium can be achieved only at a high temperature, and in a high acidity, a high salinity, and the like. In view of this, the main obstacle in the hexavalent selenium reduction process is the kinetic obstacle in the reduction process. Based on the research results, it is found in a long-term research that hydrogen peroxide may effectively reduce the activation energy in the hexavalent selenium reduction process. Thus, even at room temperature, and in a low acidity and a low salinity, hexavalent selenium could be reduced to elemental selenium by some common reducers.

Compared with the prior art, the disclosure has the following advantages.

(1) A hexavalent-selenium-containing selenic acid or selenate solution is reduced to an elemental selenium product in one step. Since hydrogen peroxide is used as a catalyst, hydrogen peroxide effectively lowers the descending speed of the reduction potential of the solution while having a catalytic effect. Therefore, the reduction reaction process is carried out gently, and then the selenium in the solution is effectively prevented from being over reduced to negatively bivalent selenium ions or the compounds thereof. Finally, problems, such as a low recovery rate caused by the over reduction of selenium, are solved.

(2) The reduction process according to the disclosure requires mild reaction conditions, and the flow path of the reaction is short while the technical effect is good. Further, the required agents and devices all are common agents and devices in the hydrometallurgy industry, and thus the industrial production of selenium is very readily achieved.

DETAILED DESCRIPTION

Unless otherwise defined, all terminologies used hereinafter have the same meaning generally comprehended by those skilled in the art. The terminologies used herein are only for illustrating the specific examples and not intended to limit the protection scope of the disclosure.

Unless otherwise specified, various agents and raw materials used herein all are commodities purchased from a market or products that may be prepared using a well-known method.

For a better understanding of the disclosure, the disclosure will be described more comprehensively in detail with reference to the drawings of the description and preferred examples hereinafter. However, the protection scope of the disclosure is not limited to the following specific examples.

Example 1

According to an embodiment, a method for catalytically reducing selenium may include the following specific steps.

Figure 1:
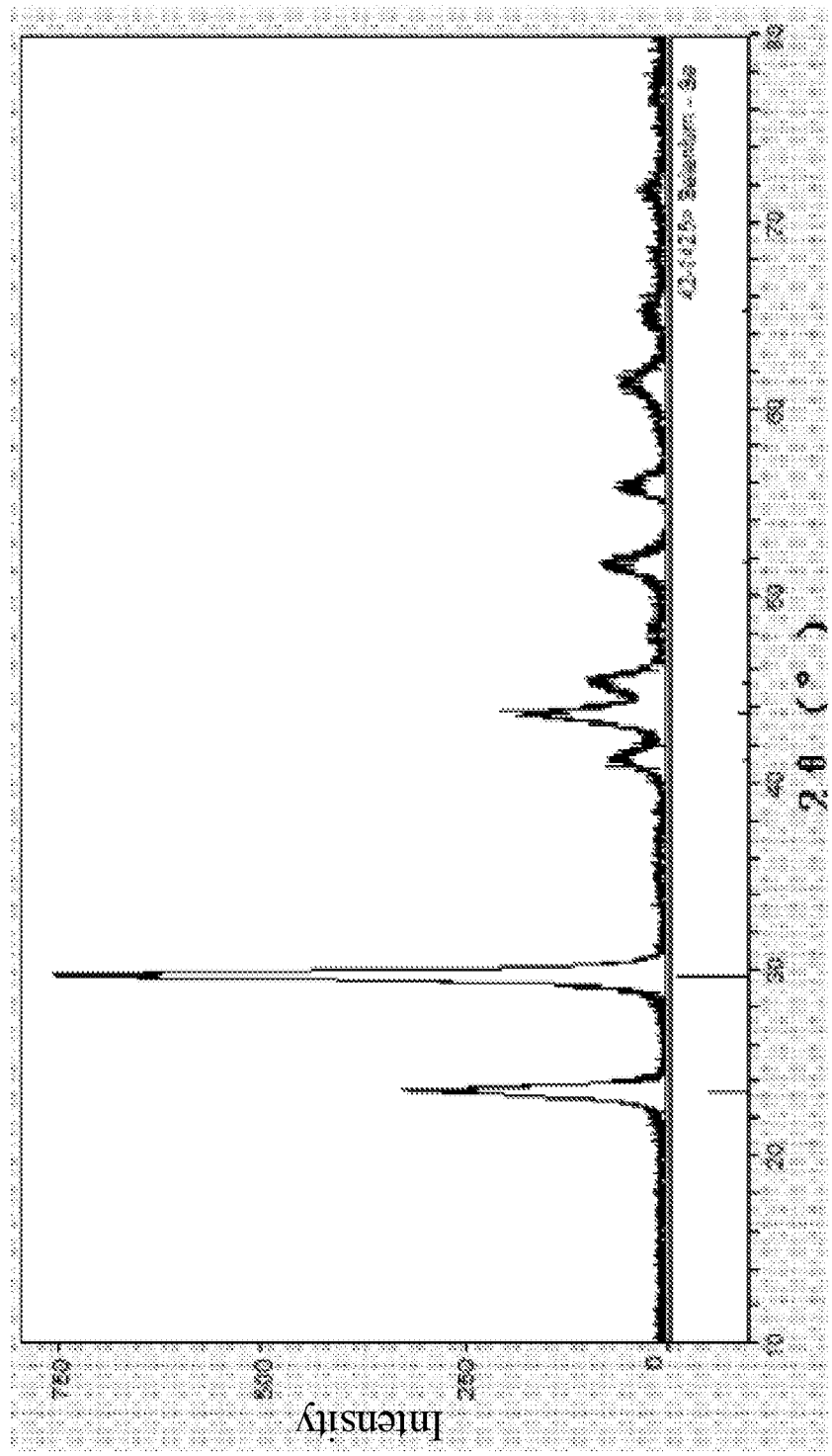
FIG. 1 is a diagram illustrating an X-ray diffraction detection of a reduced product according to Example 1 of the disclosure.

Sodium selenate ($Na_2SeO_4$) was dissolved with ultrapure water to be prepared into a sodium selenate solution, in which the selenium content in the solution was 1 g/L and the initial pH of the solution was adjusted to 2. 100 mL of the solution was taken, and added with 15 mL of analytical hydrogen peroxide by a constant flow pump. After being uniformly mixed, the resulting solution was charged with an industrial sulfur dioxide gas (with a gas flow rate of 1 L/min), meanwhile, a water bath was used to control a temperature of a reaction system at 60° C., and the reaction lasted for 2 h. After the obtained solution was filtered, the remained selenium content in the solution was detected, and the final selenium reduction rate was 99.97%. The reduction solid product was detected by X-ray diffraction (as shown in FIG. 1), scanning electron microscopy and inductively coupled plasma atomic emission spectrometry (the results are as shown in table 1). The table 1 shows that the reduction product was elemental selenium with a relatively high purity of 99.91%. As can be seen from FIG. 1, the product is a trigonal black elemental selenium.

Example 2

According to another embodiment, a method for catalytically reducing selenium may include the following specific steps.

Figure 2:
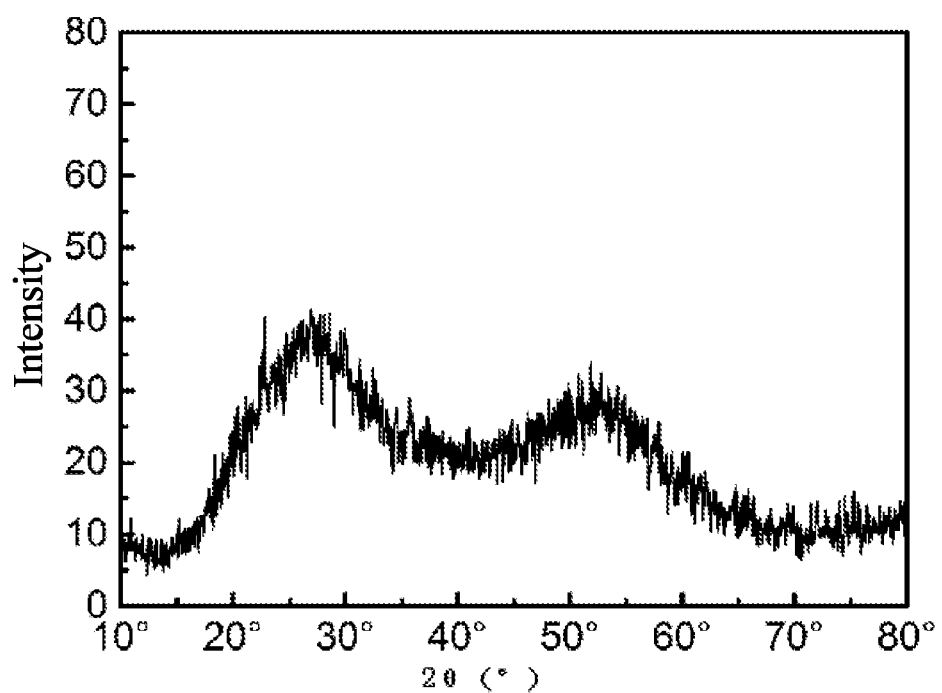
FIG. 2 is diagram illustrating an X-ray diffraction detection of a reduced product according to Example 2 of the disclosure.

Sodium selenate ($Na_2SeO_4$) was dissolved with ultrapure water to be prepared into a sodium selenate solution, in which the selenium content was 1 g/L and the initial pH of the solution was adjusted to 2. 100 mL of the solution was taken, and added with 15 mL of analytical hydrogen peroxide by a constant flow pump. After being uniformly mixed, the resulting solution was charged with an industrial sulfur dioxide gas (with a gas flow rate of 1 L/min), meanwhile, an ice-water bath was used to control a temperature of a reaction system at 0° C., and the reaction lasted for 2 h. After the obtained solution was filtered, the remained selenium content in the solution was detected, and the calculated selenium reduction rate was 99.89%. The solid product was detected by X-ray diffraction (as shown in FIG. 2), scanning electron microscopy and inductively coupled plasma atomic emission spectrometry (the results are as shown in table 1).

The table 1 shows that the reduction product was an elemental selenium with a relatively high purity. As can be seen from FIG. 2, this elemental selenium is an amorphous red elemental selenium.

Example 3

According to yet another embodiment, a method for catalytically reducing selenium may include the following specific steps.

1 L of hexavalent-selenium-containing wastewater was taken from a smeltery, in which the selenium concentration was 5.5 g/L, and impurities are arsenic ion, sodium ion, chromium ion, organic matter and the like. After the common processes of neutralization, impurity removal and the like, the concentration of selenium ion was 3.6 g/L. After 500 mL of excessive hydrogen peroxide was added to decompose the impurities such as organic matter, 30 g of sodium sulfite was added, and the temperature was controlled at 50° C. by a water bath. After 2 h of reaction, the resulting solution was filtered, the remained selenium content in the solution was detected, and the calculated selenium reduction rate was 97.87%. The X-ray detection result of the elemental selenium is the same as that in Example 1, and the detection result of the inductively coupled plasma atomic emission spectrometry is as shown in table 1.

Example 4

According to a further embodiment, a method for catalytically reducing selenium may include the following specific steps.

A selenium-tellurium containing waste material was treated by pressurized oxidizing acid leaching. Upon detection of ion chromatography, it contained 2.1 g/L of hexavalent selenium radical ions and 5 g/L selenite radical ions. 200 mL of the solution was taken, and added with 25 mL of hydrogen peroxide. The reaction temperature was controlled at 50° C. by a water bath, 5 g of sodium borohydride was added. After 2 h of reaction, the resulting solution was filtered, the remained selenium content in the solution was detected, and the calculated selenium reduction rate was 99.35%. The X-ray detection result of the elemental selenium is the same as that in Example 1, and the detection result of the inductively coupled plasma atomic emission spectrometry is as shown in table 1.

Example 5

According to another further embodiment, a method for catalytically reducing selenium may include the following specific steps.

A selenium-tellurium mixture was treated by acidic oxidizing leaching. After insoluble substances were filtered, the solution was detected, and contained 5.2 g/L hexavalent selenium ions and 18.9 g/L tetravalent selenium ions. After the solution was reduced by conventional sulfur dioxide, there remained 5.1 g/L hexavalent selenium ions. 200 mL of the solution was taken, and added with 55 mL of hydrogen peroxide. The reaction temperature was controlled at 90° C. by a water bath, and industrial sulfur dioxide (with a gas flow rate of 1.5 L/min) was charged. After 1 h of reaction, the resulting solution was filtered, the remained selenium content in the solution was detected, and the calculated selenium reduction rate was 99.53%. The X-ray detection result of the elemental selenium is the same as that in Example 1, and the detection result of the inductively coupled plasma atomic emission spectrometry is as shown in table 1.

Example 6

According to yet another further embodiment, a method for catalytically reducing selenium may include the following specific steps.

Similar to the above Example 5, 200 mL of a hexavalent selenium solution was taken, and added with 50 mL of hydrogen peroxide. The reaction temperature was controlled at 20° C. by a water bath, and industrial sulfur dioxide (with a gas flow rate of 1.5 L/min) was charged. After 1 h of reaction, the resulting solution was filtered, the remained selenium content in the solution was detected, and the calculated selenium reduction rate was 99.49%. The X-ray detection result of the elemental selenium is the same as that in Example 2, and the detection result of the inductively coupled plasma atomic emission spectrometry is as shown in table 1.

Example 7

According to yet further embodiment, a method for catalytically reducing selenium may include the following specific steps.

A selenium-tellurium containing acid slime was treated by sodium hydroxide-hydrogen peroxide oxidizing leaching. After the leaching, the pH was adjusted to be neutral to precipitate tellurium. After filtration, the solution was detected, and contained 2.2 g/L hexavalent selenium ions. 200 mL of the solution was taken, and added with 25 mL of hydrogen peroxide. After being uniformly mixed, the resulting solution was slowly added with 50 mL of a hydrazine hydrate solution with a concentration of 40%. After 2 h of reaction, the resulting solution was filtered, the remained selenium content in the solution was detected, and the calculated selenium reduction rate was 97.89%. The X-ray detection result of the elemental selenium is the same as that in Example 1, and the detection result of the inductively coupled plasma atomic emission spectrometry is as shown in table 1.

TABLE 1

Detection results of reduction products in Examples 1~7 by inductively coupled plasma atomic emission spectrometry.

| Examples | Selenium Content (%) | Impurity Content (%) |
| --- | --- | --- |
| Example 1 | 99.91 | 0.09 |
| Example 2 | 99.87 | 0.13 |
| Example 3 | 98.35 | 1.65 |
| Example 4 | 96.92 | 3.08 |
| Example 5 | 97.93 | 2.07 |
| Example 6 | 98.01 | 1.99 |
| Example 7 | 92.35 | 7.65 |

The invention claimed is:

1. A method for catalytically reducing hexavalent selenium present in a hexavalent-selenium-containing solution directly to elemental selenium, comprising:
(a) adding hydrogen peroxide into the hexavalent-selenium-containing solution to be reduced, wherein the hexavalent-selenium-containing solution is a selenic acid or selenate solution generated in chemical or metallurgical scientific research or industrial production, and the selenium present in the hexavalent-selenium-containing solution has a valence of positive hexavalent; and (b) adding a reductant into a mixture obtained from step (a) to reduce the hexavalent selenium directly to the elemental selenium;

wherein the hydrogen peroxide is used as a catalyst without oxidizing the hexavalent-selenium-containing solution, which decreases an activation energy in a reduction process of hexavalent selenium, and thus effectively reduce the hexavalent selenium directly to the elemental selenium, and wherein a ratio of a volume of the hydrogen peroxide to a concentration of hexavalent selenium in the hexavalent-selenium-containing solution is not lower than 10 mL:1 g/L.

2. The method according to claim 1, wherein a standard oxidation-reduction potential of the reductant is lower than a standard oxidation-reduction potential of a conversion of hexavalent selenium to elemental selenium.

3. The method according to claim 2, wherein the reductant is one or more of hydrazine hydrate, sulfur dioxide, sulfite and sodium borohydride.

4. The method according to claim 3, wherein a temperature of the hexavalent-selenium-containing solution in a reaction process is controlled at 0-100° C.

5. The method according to claim 2, wherein a temperature of the hexavalent-selenium-containing solution in a reaction process is controlled at 0-100° C.

6. The method according to claim 1, wherein a temperature of the hexavalent-selenium-containing solution in a reaction process is controlled at 0-100° C.

\* \* \* \* \*